(12) United States Patent
Bradford

(10) Patent No.: US 10,339,407 B2
(45) Date of Patent: Jul. 2, 2019

(54) NOISE MITIGATION IN VECTOR SPACE REPRESENTATIONS OF ITEM COLLECTIONS

(71) Applicant: MAXIM ANALYTICS, LLC, Reston, VA (US)

(72) Inventor: Roger Bradford, Great Falls, VA (US)

(73) Assignee: MAXIM ANALYTICS, LLC, Reston, VA (US)

( * ) Notice: Subject to any disclaimer, the term of this patent is extended or adjusted under 35 U.S.C. 154(b) by 0 days.

(21) Appl. No.: 15/490,722

(22) Filed: Apr. 18, 2017

(65) Prior Publication Data

US 2018/0300580 A1    Oct. 18, 2018

(51) Int. Cl.
| | | |
|---|---|---|
| *G06F 16/30* | (2019.01) | |
| *G06F 16/34* | (2019.01) | |
| *G06K 9/40* | (2006.01) | |
| *G06K 9/48* | (2006.01) | |
| *G06K 9/62* | (2006.01) | |
| *G06N 20/00* | (2019.01) | |

(52) U.S. Cl.
CPC ............... *G06K 9/40* (2013.01); *G06K 9/481* (2013.01); *G06K 9/623* (2013.01); *G06N 20/00* (2019.01)

(58) Field of Classification Search
CPC .......... G96F 17/30758; G06F 17/3071; G06F 17/30994; G06F 17/30253; G06F 17/30713; G06K 9/6223
See application file for complete search history.

(56) References Cited

U.S. PATENT DOCUMENTS

| | | | | |
|---|---|---|---|---|
| 6,003,027 A | * | 12/1999 | Prager | G06F 17/30705 |
| 6,069,808 A | * | 5/2000 | Panahi | H02M 7/53875 |
| | | | | 363/98 |
| 6,154,378 A | * | 11/2000 | Peterson | H02M 5/458 |
| | | | | 363/132 |
| 6,226,408 B1 | * | 5/2001 | Sirosh | G06K 9/6223 |
| | | | | 382/156 |
| 6,891,897 B1 | * | 5/2005 | Bevan | H04L 1/005 |
| | | | | 375/240 |
| 6,922,699 B2 | * | 7/2005 | Schuetze | G06F 16/5846 |
| 7,502,780 B2 | * | 3/2009 | Thorpe | G06F 16/954 |
| 7,672,939 B2 | * | 3/2010 | Burges | G06F 17/30327 |
| | | | | 707/999.005 |

(Continued)

*Primary Examiner* — Daniel A Kuddus
(74) *Attorney, Agent, or Firm* — Johnson, Marcou & Isaacs, LLC

(57) ABSTRACT

Mitigation of noise in vector space representations of item collections for applications such as facial recognition and spam detection. After receiving a collection of items, each item characterized by a plurality of features, a first vector space representative of the collection is prepared. Each item in the first vector space is represented by a vector that is a function of the features characterizing the item. Based on information characteristic of the first vector space, at least one of items contributing to first vector space noise, and features contributing to first vector space noise are identified. The first identified items and features are weighted to decrease the influence of the first identified items and features on vector spaces representative of the collection. A second vector space representative of the collection is prepared based on the first weighted items and features.

18 Claims, 7 Drawing Sheets

(56) References Cited

U.S. PATENT DOCUMENTS

| | | | | |
|---|---|---|---|---|
| 7,720,792 B2* | 5/2010 | Price | ............ | G06F 16/313 |
| | | | | 707/739 |
| 7,788,292 B2* | 8/2010 | Kolcz | ............ | G06Q 10/10 |
| | | | | 707/803 |
| 8,140,542 B2* | 3/2012 | Van de Par | ............ | G06F 16/68 |
| | | | | 707/748 |
| 2003/0074368 A1* | 4/2003 | Schuetze | ............ | G06F 16/5846 |
| 2003/0236787 A1* | 12/2003 | Burges | ............ | G06F 16/35 |
| 2006/0095852 A1* | 5/2006 | Trepess | ............ | G06F 16/355 |
| | | | | 715/741 |
| 2006/0271512 A1* | 11/2006 | Burges | ............ | G06F 16/35 |
| 2010/0138427 A1* | 6/2010 | Van de Par | ............ | G06F 16/68 |
| | | | | 707/748 |

* cited by examiner

NOISE MITIGATION IN VECTOR SPACE REPRESENTATIONS OF ITEM COLLECTIONS

TECHNICAL FIELD

The technology disclosed herein is related to mitigation of noise in vector space representations of item collections. Specific embodiments relate to mitigation of noise in facial recognition and spam filtering applications of vector space representations.

SUMMARY

These and other aspects, objects, features, and advantages of the example embodiments will become apparent to those having ordinary skill in the art upon consideration of the following summary description of illustrated example embodiments.

Embodiments of the technology disclosed herein include methods, systems, and computer program products, to mitigate noise in vector space representations of item collections for applications such as facial recognition and spam detection. In some embodiments, a computer system receives a collection of items. Each item is characterized by a plurality of features. A first vector space representative of the collection is prepared. Each item in the first vector space is represented by a vector that is a function of the features characterizing the item. Based on information characteristic of the first vector space, at least one of items contributing to first vector space noise, and features contributing to first vector space noise are identified. The first identified items and features are weighted to decrease the influence of the first identified items and features on vector spaces representative of the collection. A second vector space representative of the collection is prepared based on the first weighted items and features.

In some embodiments, the first weighting includes deleting the first identified items from the collection before preparing the second vector space.

In some embodiments, each item is characterized by a category feature having a category value. In such embodiments, first identifying items comprises identifying particular items characterized by a vector in the first vector space that is closer to the centroid of item vectors associated with at least one other category value than to the centroid of the item vectors associated with the category value of the particular item.

In some embodiments, each item is characterized by a category feature having a category value, and each category value is represented by the centroid of vectors of items characterized by the category value. In such embodiments, first identifying features contributing to first vector space noise includes identifying the N feature vectors closest to the centroid of the item vectors of at least one category value, and identifying the M feature vectors farther than X feature vectors from the centroid of the at least one category value, wherein X is greater than or equal to N. In such embodiments, first weighting the first identified items and features includes weighting the identified N feature vectors to increase the influence of the N feature vectors on vector spaces representative of the collection, and weighting the identified M feature vectors to decrease the influence of the M feature vectors on vector spaces representative of the collection.

In some embodiments, first identifying includes identifying only a first one of items contributing to vector space noise and features contributing to vector space noise. In such embodiments, after preparing the second vector space representation, the technology further identifies, based on information characteristic of the second vector space, the other one of items contributing to second vector space noise and features contributing to second vector space noise. In such embodiment, the second identified items and features are second weighted to decrease the influence of the second identified items and features on vector spaces representative of the collection. In such embodiments, a third vector space representative of the collection is prepared based on the cumulatively weighted items and features, wherein each item is represented by a vector that is a function of the features, or of the feature vectors, comprising the item.

In some embodiments, first identifying includes identifying only a first one of items contributing to vector space noise and features contributing to vector space noise. In such embodiments, the technology disclosed herein, after preparing the second vector space representation, second identifies, based on information characteristic of the second vector space, the first one of items contributing to second vector space noise and features contributing to second vector space noise. The second identified items and features are then second weighted to decrease the influence of the second identified items and features on vector spaces representative of the collection. A third vector space is prepared representative of the collection based on the cumulatively weighted items and features.

In some embodiments, each prepared vector space is a latent semantic indexed vector space. In some embodiments (where a plurality of items are characterized by a category feature), the technology folds in to the second vector space a vector corresponding an item to be categorized, and categorizes the item to be categorized with the category value(s) of the category feature(s) having a vector in the second vector space closest to the folded-in vector.

DETAILED DESCRIPTION OF THE EXAMPLE EMBODIMENTS

Overview

Embodiments herein provide computer-implemented techniques to mitigate noise in vector space representations of item collections. Specific embodiments relate to mitigation of noise in facial recognition and spam filtering applications of vector space representations.

A trend in modern information processing systems is the incorporation of techniques for dealing with the actual meaning of data items. One example of this is in the application of text retrieval. For many years, text retrieval systems did not attempt to model or otherwise address the actual meaning of terms ("features" in the more general sense). Documents ("items" in the more general sense) were retrieved based on their containing character strings that matched those appearing in user queries.

Systems that are more modern than character string matching employ representations that attempt to capture the semantics of terms and documents. The most widely used techniques for representing the semantic relationships among features and items are those employing vector spaces. Semantic vector spaces have been successfully employed in a wide variety of applications, including filtering spam, automatic annotation of images, facial recognition, information visualization, and in Internet applications for recommending hash tags, locating web services, and in recommending web pages.

The scale of modern information processing applications necessitates the use of automated techniques for creating the desired semantic representations. The representations are generated by analysis of a collection (or "corpus") of items that are deemed representative of the problem of interest. The analysis typically involves measurement of relationships among large numbers of features and items and satisfaction of multiple simultaneous constraints on these relationships. For the most widely used of the techniques, the representation vector produced for a given feature or item affects, and is affected by, the vectors for many other (often all the other) features and items in the collection.

This holistic aspect of semantic vector space techniques is the source of much of their strength. However, it also can be a weakness in that errors in individual vectors induce errors in many other vectors. Embodiments of the technology disclosed herein mitigate the effects of such errors.

By using and relying on the methods and systems described herein, the technology disclosed herein can provide improved accuracy in comparison to other methods and higher computational efficiency in comparison to other techniques for noise reduction in semantic spaces, hence improving the operation of the computing resources implementing such techniques.

Turning now to the drawings, in which like numerals represent like (but not necessarily identical) elements throughout the figures, example embodiments are described in detail.

Example System Architectures

Figure 1:
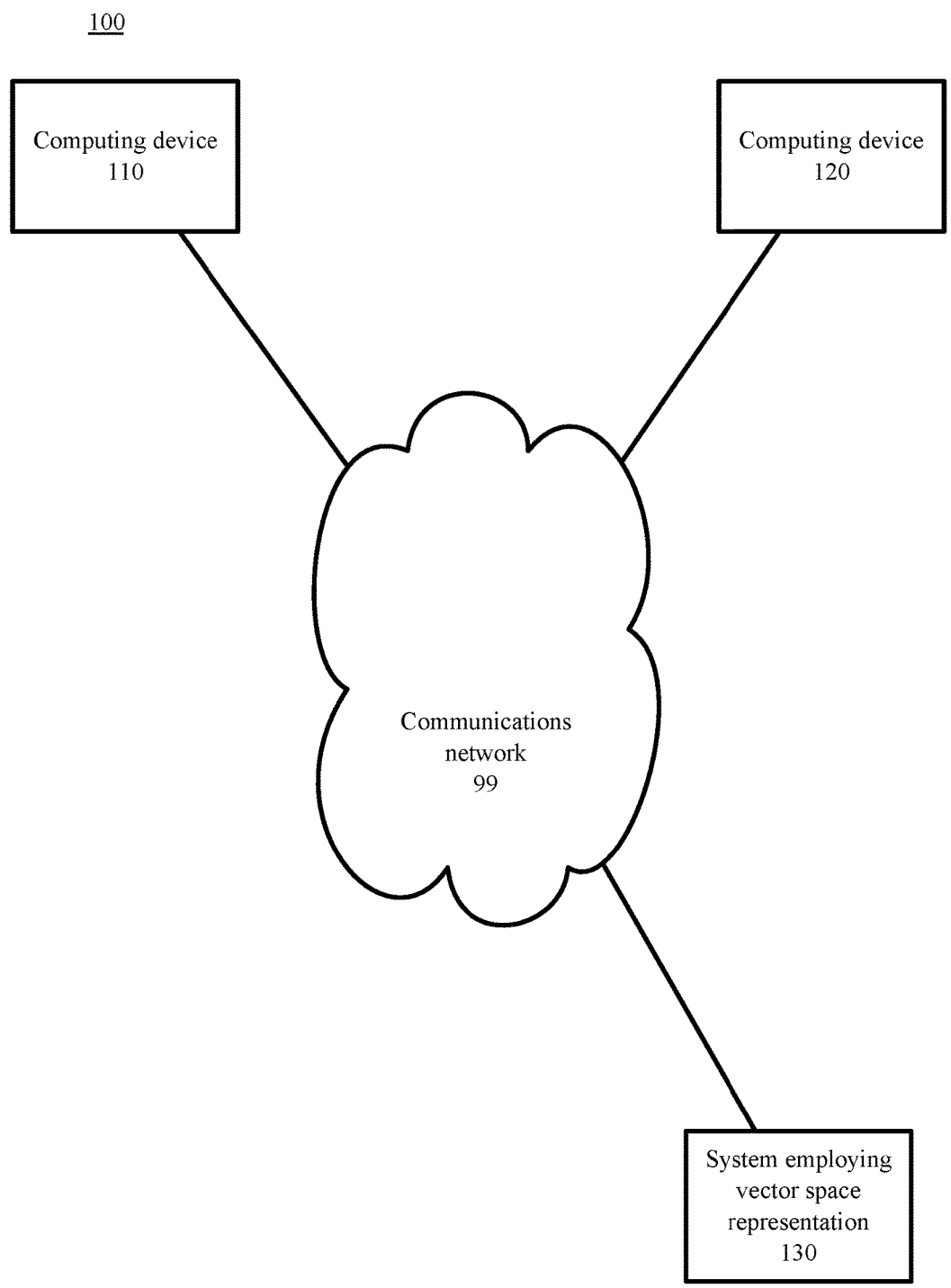
FIG. 1 is a block diagram depicting an architecture for mitigation of noise in vector space representations of item collections, in accordance with certain example embodiments.

FIG. 1 is a block diagram depicting a communications and processing architecture 100 to mitigate noise in vector space representations of item collections, in accordance with certain example embodiments. While each server, system, and device shown in the architecture is represented by one instance of the server, system, or device, multiple instances of each can be used. Further, while certain aspects of operation of the present technology are presented in examples related to FIG. 1 to facilitate enablement of the claimed invention, additional features of the present technology, also facilitating enablement of the claimed invention, are disclosed elsewhere herein.

As depicted in FIG. 1, the architecture 100 includes network devices 110, 120, and 130; each of which may be configured to communicate with one another via communications network 99. In some embodiments, a user associated with a device must install an application and/or make a feature selection to obtain the benefits of the technology described herein.

Network 99 includes one or more wired or wireless telecommunications means by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device 110, 120, and 130 can include a communication module capable of transmitting and receiving data over the network 99. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device. In the example embodiment depicted in FIG. 1, a user of the system 130 that employs a vector space representation may operate each of network devices 110 and 120. Network device 130 may be an autonomous system, for example, a facial recognition system that includes sensors in communication with computing devices that build and use a vector space representation of facial images each characterized by facial features.

The network connections illustrated are examples and other means of establishing a communications link between the computers and devices can be used. Moreover, those having ordinary skill in the art having the benefit of the present disclosure will appreciate that the network devices illustrated in FIG. 1 may have any of several other suitable computer system configurations. For example, computing device 110 may be embodied as a mobile phone or handheld computer and may not include all the components described above.

Figure 6:
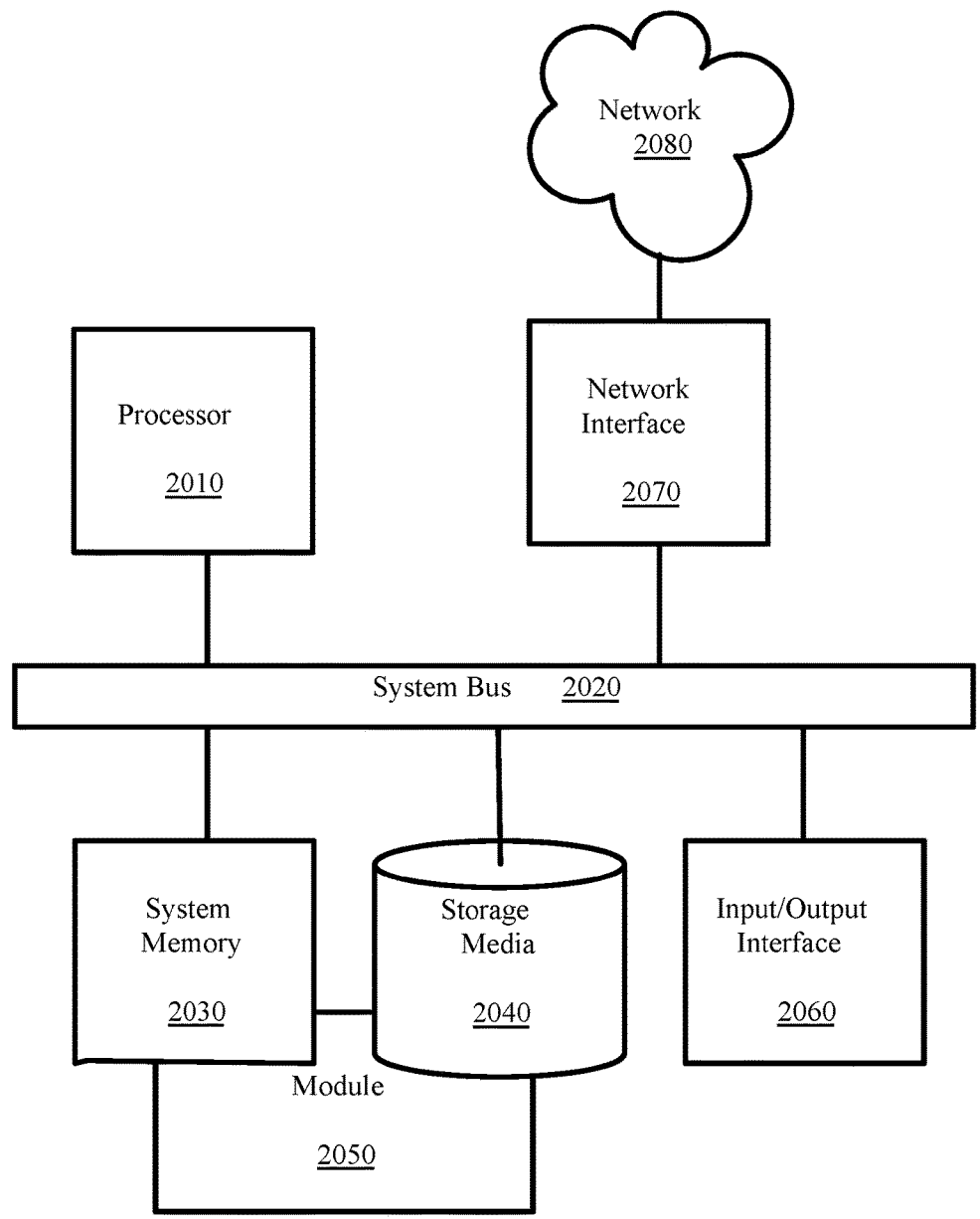
FIG. 6 is a block diagram depicting a computing machine and a module, in accordance with certain example embodiments.

In example embodiments, the network computing devices, and any other computing machines associated with the technology presented herein, may be any type of computing machine such as, but not limited to, those discussed in more detail with respect to FIG. 6. Furthermore, any modules associated with any of these computing machines, such as modules described herein or any other modules (scripts, web content, software, firmware, or hardware) associated with the technology presented herein may be any of the modules discussed in more detail with respect to FIG. 6. The computing machines discussed herein may communicate with one another as well as other computer machines or communication systems over one or more networks, such as network 99. The network 99 may include any type of data or communications network, including any of the network technology discussed with respect to FIG. 6.

Example Processes

The example methods illustrated in the figures are described hereinafter with respect to the components of the example operating environment 100. The example methods also can be performed with other systems and in other environments. The operations described with respect to any of the figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
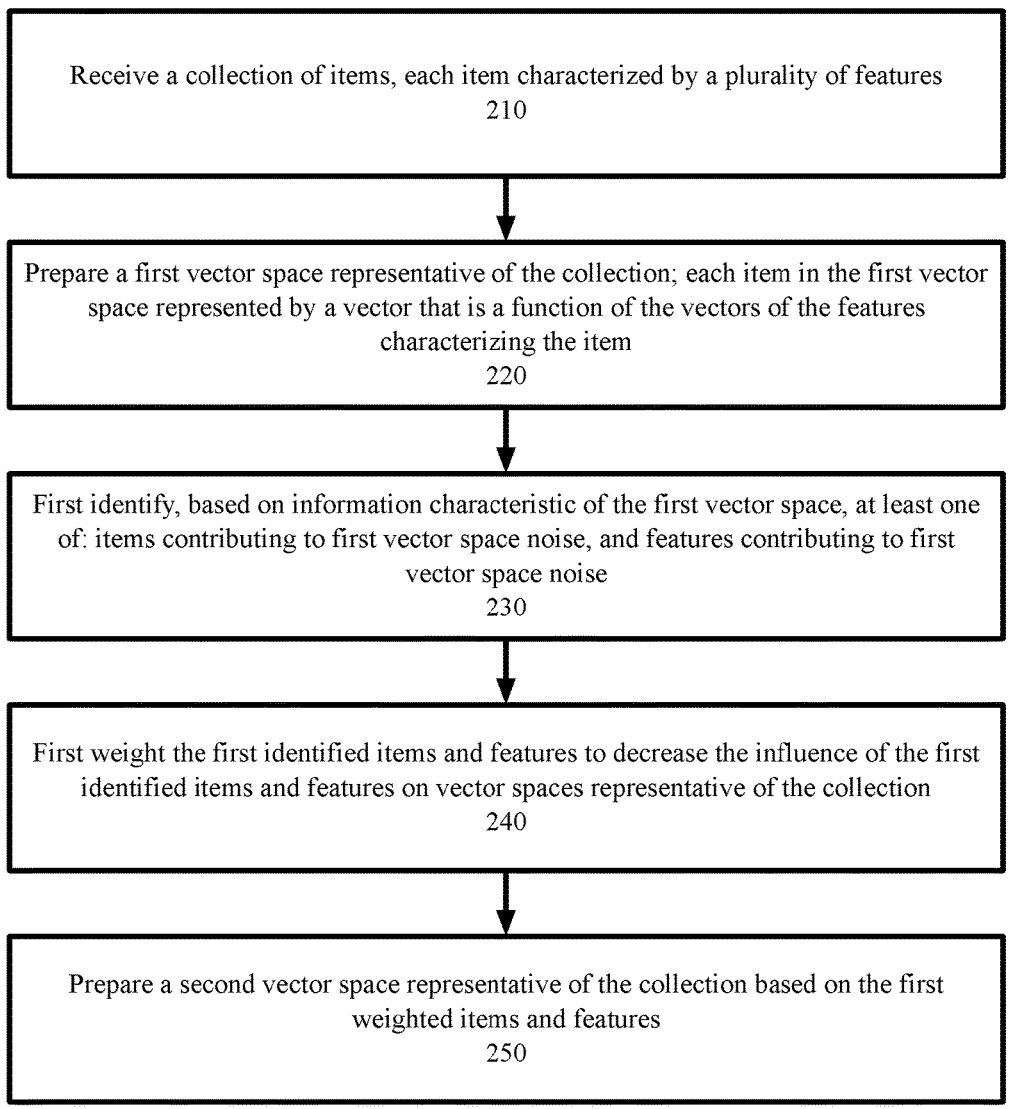
FIG. 2 is a block flow diagram depicting a method to mitigate noise in vector space representations of item collections, in accordance with certain example embodiments.

Referring to FIG. 2, and continuing to refer to FIG. 1 for context, a block flow diagram depicting a method 200 to mitigate noise in vector space representations of item collections is shown, in accordance with certain example embodiments.

In such a method 200, a collection of items is received by one or more computing devices—Block 210. Each item is characterized by a plurality of features. The "items" and "item features" (or simply "features") can be, for example: facial images and facial image features for facial recognition; e-mail messages and e-mail message features such as text, sender, time received, size, etc. for spam mitigation.

In a continuing example, two collections of items from the Reuters 21578 test set were stored in a memory device of system 130 or of computing device 120. The full collection consists of 21,578 documents that appeared on the Reuters news wire in 1987 (thus the name Reuters 21578 test set). Over the past 20 years, this test set has become widely accepted as a basis for comparison of document categorization techniques. The test set encompasses 120 topic categories, with some documents being assigned more than one category. Within the Reuters 21578 framework, most researchers have employed one or more of four subsets of categories, ranging from 8 to 90 categories. The continuing example uses the Reuters 21578 R8 single-label subset (which includes documents from the 8 categories having the greatest number of training documents) and the Reuters 21578 R52 single-label subset (which includes documents from the 52 categories which have at least one training and one test document, and for which all documents belong to a single category).

Over the past decade, the great majority of researchers using the Reuters 21578 test set have employed a standard partitioning of the test versus training documents, known as the mod Apté split. This division assigns approximately 75% of the documents to a training set and 25% to a test set, and is used in the continuing example.

While the continuing example is a document categorization example, the present technology is applicable to a wide variety of problem domains, including facial recognition and spam filtering. The document categorization example is used herein as it more completely and simply demonstrates various aspects of the technology than other examples. In the Reuters 21578 test set, the "items" are documents. Each "item" comprises terms as "features." Each "item" also comprises at least one topic category feature, though in many applications the category feature is not necessary to obtain benefits of the technology disclosed herein.

In embodiments of the technology disclosed herein, a first vector space representative of the collection is prepared—Block 220. Each item in the first vector space is represented by a vector that is a function of the vectors of the features characterizing the item. In the continuing example, a first vector space representation of each of the two subsets of the Reuters 21578 test set was prepared using Latent Semantic Indexing (LSI) by system 130.

Of the various approaches to generating semantic vector space representations, perhaps the best known and most effective is that of LSI. LSI is used in a broad range of commercial applications, ranging from spam filtering, to automated essay scoring, to literature-based discovery, to facial recognition. For this reason it is used here as an example semantic vector space representation technique.

LSI is an information organization and analysis tool that has wide applicability. The technique relies on the notion of distributional semantics—specifically, that the meaning of a term in text is directly correlated with the contexts in which it appears. LSI (as applied to text) accepts as input a collection of documents and produces as output a high-dimensional vector space. Vectors in this vector space represent all of the documents in the collection. Similarly, all of the terms that comprise those documents are represented by vectors in this vector space (except for very frequently occurring terms that typically are ignored, e.g., treated as stopwords).

In typical implementations, LSI employs the technique of singular value decomposition (SVD) to carry out a large-scale dimensionality reduction (as described below). Dimensionality reduction has at least two effects. First, terms that are semantically related are represented by vectors that lie close together in the LSI vector space. Second, documents that have similar conceptual content are represented by vectors that lie close together in the space.

Although LSI primarily has been used with text, it is a completely general technique and can be applied to any collection of items composed of features. LSI has, for example, been used with great success on audio, image, and video data. For simplicity, this discussion will deal with text. However, all of the principles described apply to other types of data.

The LSI technique applied to a collection of documents includes the following. A matrix A is formed, wherein each row corresponds to a term that appears in the documents, and each column corresponds to a document. Each element $a_{m,n}$ in the matrix corresponds to the number of times that the term m occurs in document n.

Local and global term weighting can be applied to the entries in the term-document matrix. This weighting may be applied in order to achieve multiple objectives, including compensating for differing lengths of documents and improving the ability to distinguish among documents. Some very common words such as and, the, etc. typically are deleted entirely (e.g., treated as stopwords).

Singular value decomposition (SVD) is used to reduce this matrix to a product of three matrices: $A = U \Sigma V^T$.

Let A be composed of t rows corresponding to terms and d columns corresponding to documents. U is then a t*t orthogonal matrix having the left singular vectors of A as columns. V is a d*d orthogonal matrix having the right singular vectors of A as columns. $\Sigma$ is a t*d diagonal matrix whose elements are the singular values of A (the non-negative square roots of the eigenvalues of $AA^T$).

Dimensionality is reduced by deleting all but the k largest values of $\Sigma$, together with the corresponding columns in U and V, yielding an approximation of A: $A_k = U_k \Sigma_k V_k^T$. This is the best rank-k approximation to A in a least-squares sense. This truncation process provides the basis for generating a k-dimensional vector space. Both terms and documents are represented by k-dimensional vectors in this vector space.

New documents (e.g., queries) and new terms are represented in the space by a process known as folding-in. To add a new document, for example, that document is first subjected to the same pre-processing steps (e.g., stopword removal) as those applied to the original documents used in creating the space. The document then is assigned a representation vector that is the weighted average of the representation vectors for the terms of which it is composed. An analogous process is employed to fold in new terms.

The similarity of any two objects represented in the space is reflected by the proximity of their representation vectors, generally using a cosine measure of the angle between the vectors. Results of queries are sorted by cosine: the higher the cosine, the more similar the returned object (term or document) is to the query.

Extensive experimentation has shown that proximity of objects in such a space is an effective surrogate for conceptual similarity in many applications.

The computations involved in creating an LSI space result in an advantageous duality. The LSI representation vector for any document corresponds to the weighted average of the LSI vectors for the terms contained in that document. The LSI representation vector for any term corresponds to the weighted average of the LSI vectors for the documents that contain that term.

Accordingly, in an LSI space (as in typical vector spaces) everything depends upon everything else. Errors associated with any given term or document propagate, having a deleterious effect on the representation vectors of other terms and documents. In typical LSI applications, there is a corpus of documents from which the space is constructed. For any given application, there will be aspects of the documents that are essentially related to the problem of interest and others that are purely incidental. Similarly, some terms will occur in associations that are directly related to the problem at hand, while other associations will be coincidental. Both situations constitute a type of "noise" with regard to the processing objective.

Based on information characteristic of the first vector space, at least one of 1) items contributing to first vector space noise, and 2) features contributing to first vector space noise, are first identified—Block 230. Historically, most of the effort to mitigate against feature and item noise in vector space representation of items has been focused on the preprocessing stage prior to determining a vector space for the collection of items. Preprocessing uses techniques such as feature weighting, pruning, multi-feature expressions, duplicate detection and removal, and repetitive feature removal. When preprocessing techniques are employed on the collection, some portion of the noise associated with a given problem can be eliminated. However, there still remain aspects of term and document noise that cannot be dealt with in this manner. Once the vector space has been created, other methods may be used to identify the sources of this remaining noise. The two most commonly used techniques of this type are training set outlier detection and noisy feature vector detection.

Regarding training set outlier detection, in item categorization applications there frequently will be training items that are not good examples of the category that they are intended to represent. In some cases, the item may contain features or feature sequences that pertain to multiple categories, rendering the item a weak example of any one category. In other cases, there may be numerous features whose occurrence in the item is incidental. This will emphasize semantic relations that are not directly relevant to the category distinctions to be made. It also is not unusual to encounter training items that are mislabeled. Training items tagged with incorrect category labels can significantly increase the error rate of automated categorization.

One technique for identifying outliers among training items is to examine the vectors associated with the training items from individual categories. One frequently employed method of such examination is to compare the representation to the centroids of the vectors of training items having the same category label. If the vector for a training item with a given category label is too far from the centroid of the training vectors with that label, it is identified as a source of noise. Similarly, if it is too close to the centroid of training vectors with a different category label it also can be identified as a source of noise.

Regarding noisy feature vector detection, in some categorization applications, there will be from thousands to hundreds of thousands of features. The value of individual features in distinguishing among categories will vary by orders of magnitude. This may be true even though there were local and global weights applied to the features during a preprocessing stage of building the vector space. Once the vector space has been created, feature vectors can be compared both with item vectors and with other feature vectors. Individual feature vectors can be compared to the representation vectors for training items having given category labels, or with the centroids of the vectors associated with a category.

In the continuing example, in the vector space representations for each of the R8 and R52 training documents, each labeled training document was examined to determine if it was a good representative of its assigned category using system 130—e.g., training set outlier detection. This was done by comparing each such document with the centroid of the other training documents labeled as belonging to that category. During this analysis, it was found that in the R52 training document vector space 145 documents (out of 6,532 total) were outliers. Their LSI representation vectors were closer to the centroids of vectors associated with two other categories than they were to the centroid of the vectors of training documents with their own category label. In the case of the R8 training document vector space, 189 (out of 5,485 total) training documents were outliers. Their LSI representation vectors were closer to the centroids of vectors associated with one other category than they were to the centroid of the vectors of training documents with the same category label. Employing these training vectors in making classification decisions would yield significant errors. The standard approach at this point would be to simply ignore these vectors during classification without recalculating the vector space.

Note that either, or both, of training set outlier detection and noisy feature detection can be performed at this point.

The first identified items and features are weighted to decrease the influence of the first identified items and features on vector spaces representative of the collection—Block 240.

In the continuing example, only the documents (i.e., items) contributing to vector space noise were identified. The identified documents, 145 documents from the R52 subset and 189 documents from the R8 subset, are deleted from the respective subset (i.e., weighted to "0") by system 130. The effect of these deleted vectors on the fidelity of the first LSI vector spaces is amplified because the category tag of each training document is used as an additional feature in creating the LSI vector space.

A second vector space representative of the collection based on the first weighted items and features is prepared—Block 250.

In the continuing example, system 130 was used to prepare a second LSI space based on the remaining documents (those not weighted to "0") in each of the R8 and R52 subsets in the manner described above for preparing LSI spaces. Eliminating the outlier documents and building a new LSI space resulted in a space that more accurately reflected the semantics of the categorization problem. Tests at this point showed significantly improved categorization accuracy in the refined spaces compared to that in the initial LSI spaces. This mitigation of document noise was significant even though efforts had been made to reduce document noise during the preprocessing effort prior to building the initial LSI space. The iteration of the space was useful, in part because the information required to determine the outliers simply was not available until analyses had been carried out in the initial LSI space.

Figure 3:
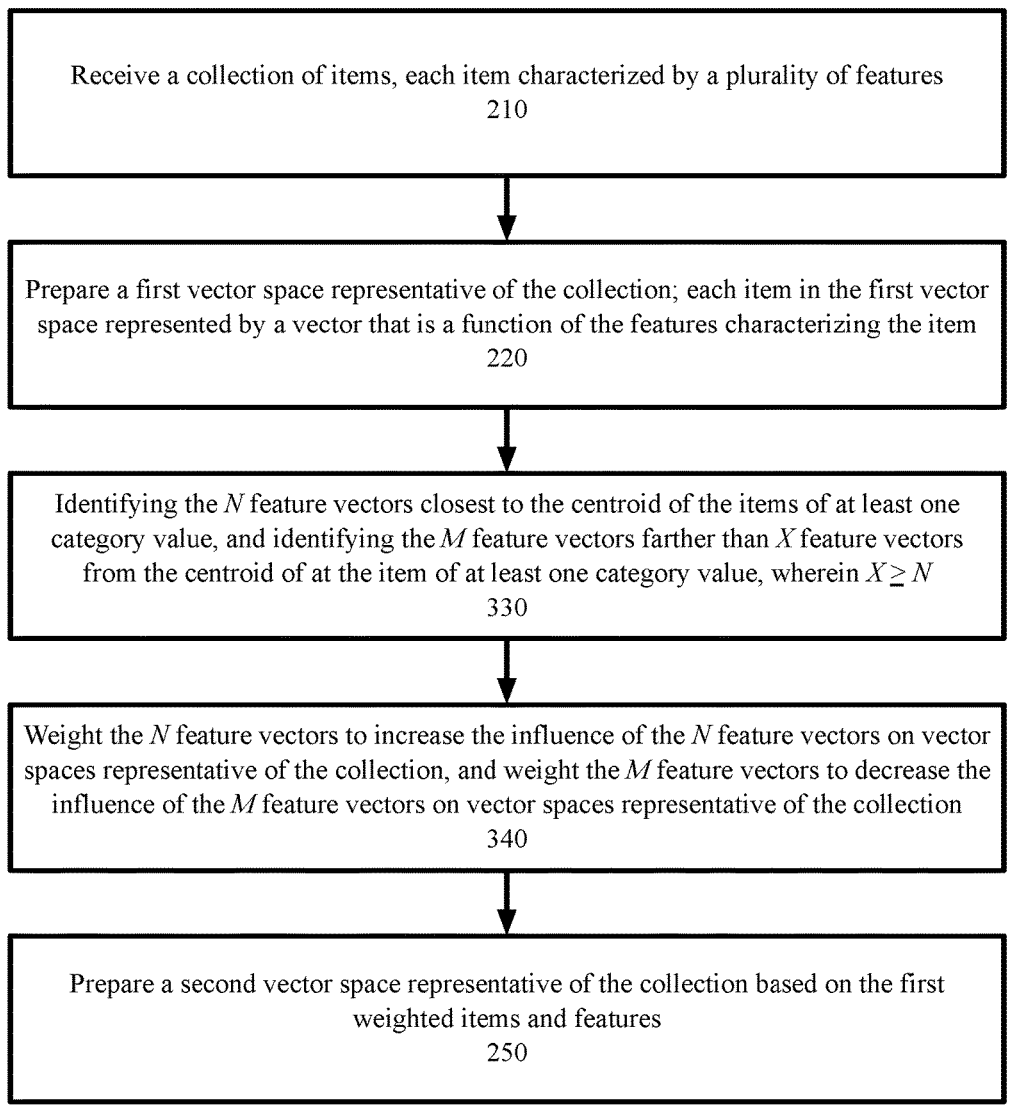
FIG. 3 is a block flow diagram depicting a method to mitigate noise in vector space representations of item collections, in accordance with certain example embodiments.

Referring to FIG. 3, and continuing to refer to prior figures, a block flow diagram depicting a method 300 to mitigate noise in vector space representations of item collections is shown, in accordance with certain example embodiments. In such a method 300, Blocks 210, 220, and 250 are performed as described elsewhere herein. In such methods, each item in the collection is characterized by a category feature having a category value, and each category value is represented by the centroid of items characterized by the category value.

In such embodiments, first identifying features contributing to first vector space noise includes identifying the N feature vectors closest to the centroid of the item vectors of at least one category value, and identifying the M feature vectors farther than X feature vectors from the centroid of the item vectors of the at least one category value, wherein X is greater than or equal to N—Block 330. In a variation of the continuing example, features were divided into three sets. In the first set were terms vectors among the 10 (corresponding to N) closest term vectors to the centroid of at least one of the categories. In the second set were (M) terms vectors not among the closest 400 (X) term vectors to the centroid of at least one of the categories. In the third set were all other term vectors.

In such embodiments, first weighting the first identified items and features includes weighting the identified N feature vectors to increase the influence of the N feature vectors on vector spaces representative of the collection, and weighting the identified M feature vectors to decrease the influence of the M feature vectors on vector spaces representative of the collection—Block 340.

In the variation of the continuing example, terms vectors in the first set were given added weight, by multiplying the weights of these terms by 1.4. A weight of zero was assigned to the term vectors in the second set. The weights of the terms in the third set were left unchanged. These selection and weighting parameters were found by testing a few logical candidate values for each, using the validation set. In the continuing example, terms were partitioned into only three sets and employed simple weighting in order to avoid over-fitting the training data. Other numbers of sets with different values of NM, and X, or an entirely different weighting function, can be used.

Figure 4A:
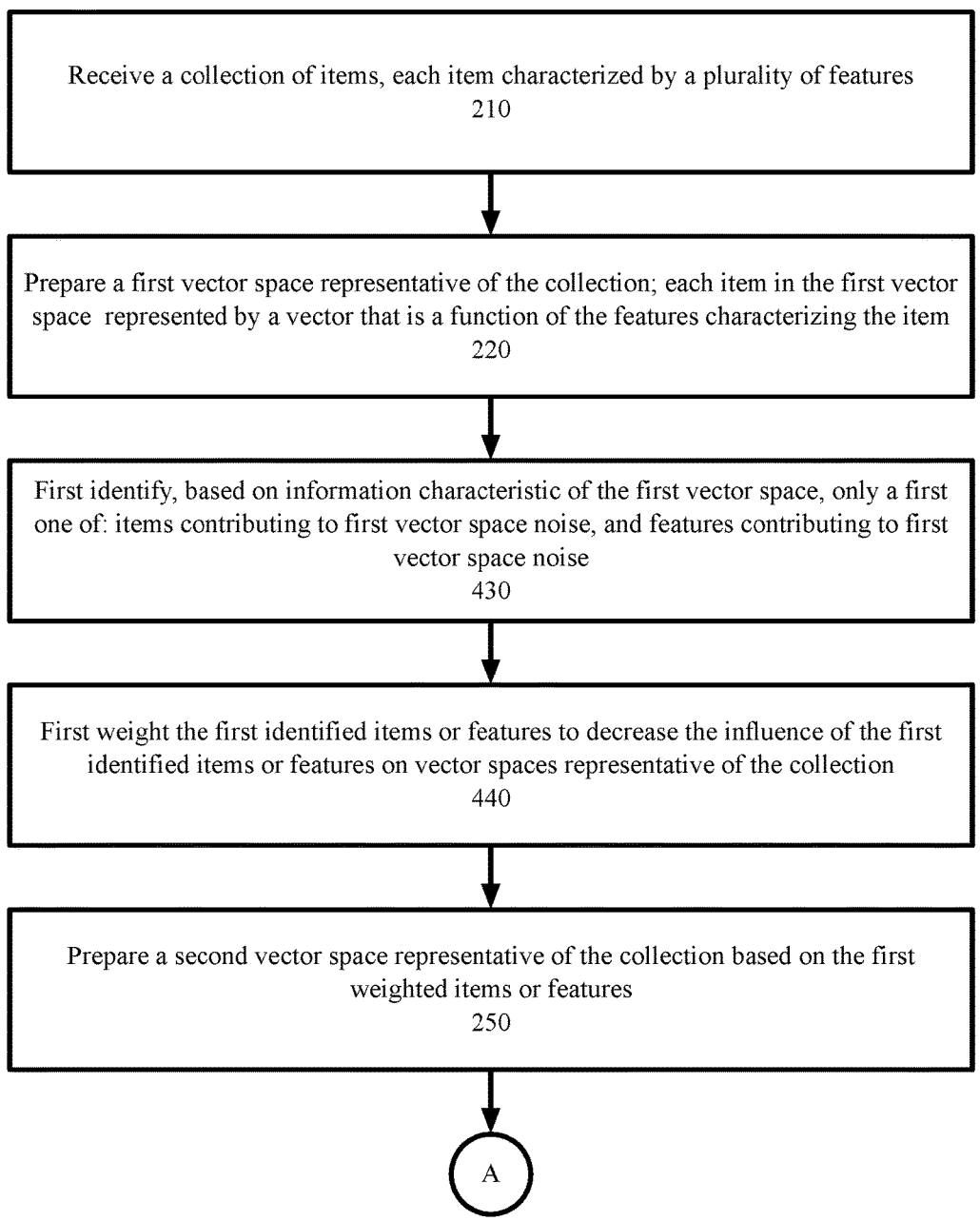
FIGS. 4A and 4B are block flow diagrams depicting a method to mitigate noise in vector space representations of item collections, in accordance with certain example embodiments.
Figure 4B:
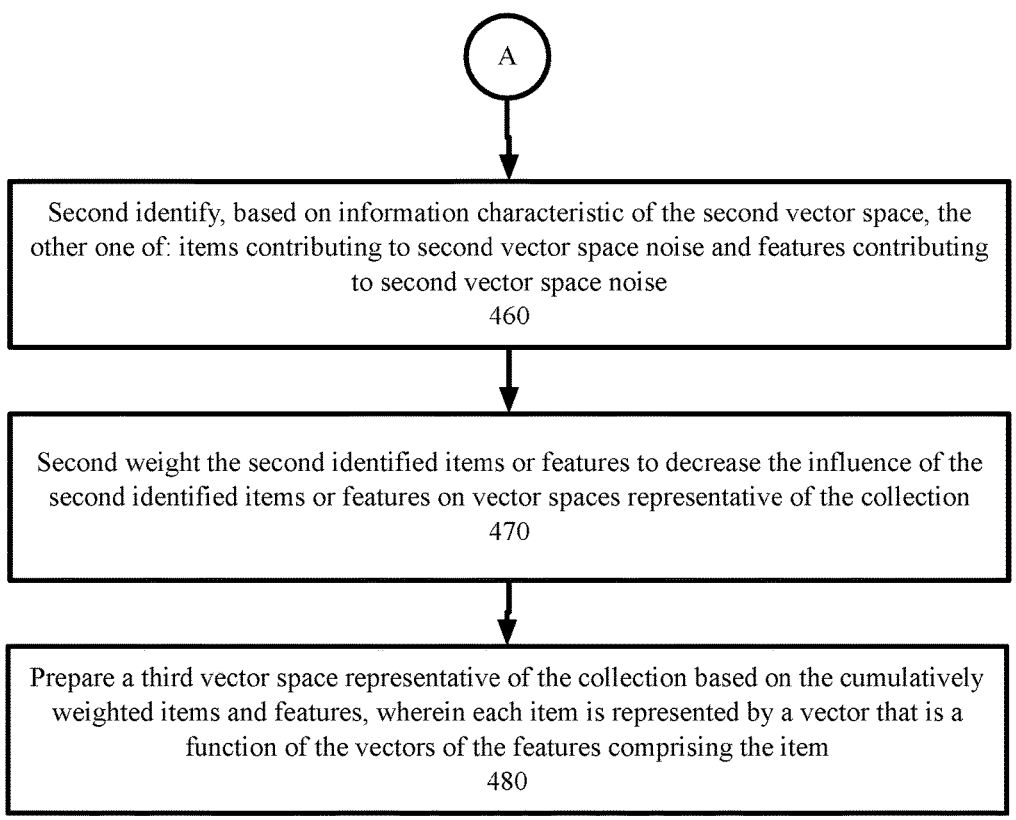

Referring to FIG. 4A and FIG. 4B, and continuing to refer to prior figures, a block flow diagram depicting a method 400 to mitigate noise in vector space representations of item collections is shown, in accordance with certain example embodiments. In such a method 400, Blocks 210, 220, and 250 are performed as described elsewhere herein.

In such embodiments, after receiving a collection of items (Block 210) and preparing a first vector space representative of the collection (Block 220), system 130 identifies, based on information characteristic of the first vector space, only a first one of: items contributing to first vector space noise, and features contributing to first vector space noise—Block 430. In the continuing example, as described in conjunction with Block 230, in the vector space representations for each of the R8 and R52 training documents, each labeled training document was examined to determine if it was a good representative of its assigned category using system 130—e.g., training set outlier detection.

In such embodiments, system 130 first weights the first identified items or features to decrease the influence of the first identified items or features on vector spaces representative of the collection—Block 440. In the continuing example, the identified documents, 145 documents from the R52 subset and 189 documents from the R8 subset, are deleted from the respective subset (i.e., weighted to "0") by system 130, as described in conjunction with Block 240.

After preparing the second vector space representative of the collection based on the first weighted items or features (Block 250), system 130 moves on to the one of either document noise or term noise that was not addressed in the first round, second identifying, based on information characteristic of the second vector space, the other one of: items contributing to second vector space noise and features contributing to second vector space noise—Block 460. In the continuing example, features were divided into three sets as described above in connection with Block 330. In the first set were terms vectors among the 10 (corresponding to N) closest term vectors to the centroid of at least one of the categories. In the second set were (M) terms vectors not among the closest term vectors to the centroid of at least one of the categories. In the third set were all other term vectors.

In such embodiments, system 130 second weights the second identified items or features to decrease the influence of the second identified items or features on vector spaces representative of the collection—Block 470. In the continuing example, as described above in connection with Block 340, terms vectors in the first set (closest) were given added weight, by multiplying the weights of these terms by 1.4. A weight of zero was assigned to the terms in the second set (farthest). The weights of the terms in the third set (intermediate) were left unchanged. These selection and weighting parameters were found by testing a few candidate values for each, using the validation set. In the continuing example, terms were partitioned into only three sets and employed simple weighting in order to avoid over-fitting the training data. Other numbers of sets with different values of N and X, or an entirely different weighting function, can be used.

After second weighting the second identified items or features, system 130 prepares a third vector space representative of the collection based on the cumulatively weighted items and features, wherein each item is represented by a vector that is function of the vectors of the features comprising the item—Block 480. In the continuing example, system 130 was used to prepare a third LSI space based on the remaining documents (those not weighted to "0") and the weighted terms in each of the R8 and R52 subsets in the manner described above for preparing LSI spaces. Eliminating the outlier documents and noisy terms, emphasizing terms that are more pertinent, and building a third LSI space resulted in a space which more accurately reflected the semantics of the categorization problem.

In some embodiments, instead of alternating between mitigating item noise and feature noise from one iteration of the vector space to the next, two successive iterations can be made to mitigate the same noise source.

Figure 5:
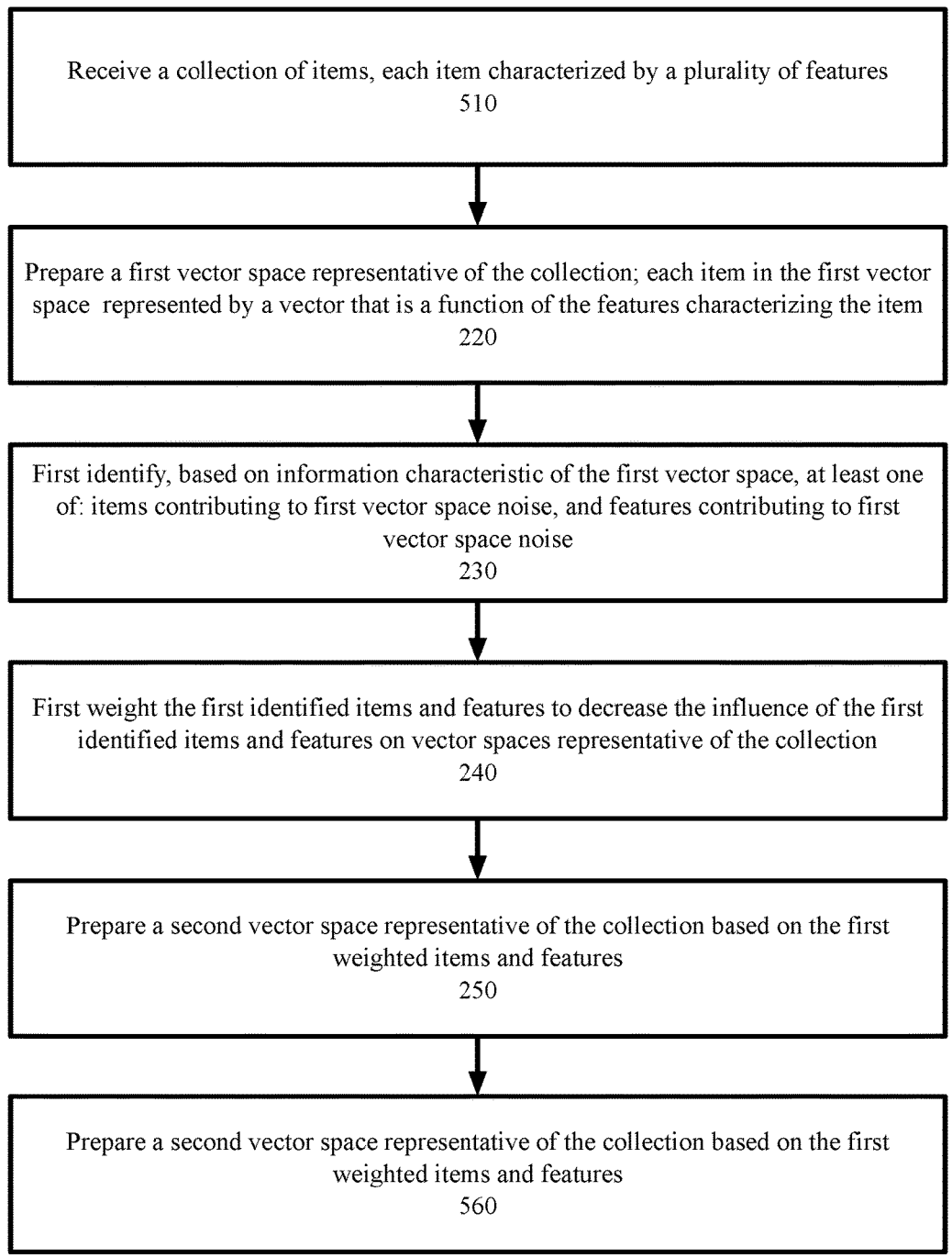
FIG. 5 is a block flow diagram depicting a method to mitigate noise in vector space representations of item collections, in accordance with certain example embodiments.

Referring to FIG. 5, and continuing to refer to prior figures, a block flow diagram depicting a method 500 to mitigate noise in vector space representations of item collections is shown, in accordance with certain example embodiments. In such a method 500, Blocks 220-250 are performed as described elsewhere herein.

In such a method 500, a collection of items is received by one or more computing devices, with each item characterized by a category feature having a category value—Block 510. Each item is characterized by a plurality of features. The "items" and "item features" (or simply "features") can be, for example: facial images and facial image features for facial recognition; e-mail messages and e-mail message features such as text, sender, time received, size, etc. for spam mitigation.

After preparing a first vector space (as described, for example, in connection with Block 220), identifying at least one of items and features contributing to noise (as described, for example, in connection with Block 230), weighting the first identified items/features to reduce the influence of the first identified items/features (as described, for example, in Block 240), and preparing a second vector space based on the weighted collection (as described, for example, in Block 250), the method 500 folds in to the second vector space a vector corresponding to an item to be categorized and categorizes the item with the category value of the category feature having a vector in the second vector space closest to the folded-in vector—Block 560.

New documents (e.g., queries) and new terms are represented in the space by a process known as folding-in. To add a new document, for example, that document is first subjected to the same pre-processing steps (e.g., stopword removal) as those applied to the original documents used in creating the space. The document then is assigned a representation vector that is the weighted average of the representation vectors for the terms of which it is composed. An analogous process is employed to fold in new terms.

The similarity of any two objects represented in the space is reflected by the proximity of their representation vectors, generally using a cosine measure of the angle between the vectors. Results of queries are sorted by cosine: the higher the cosine, the more similar the returned object (term or document) is to the query. Extensive experimentation has shown that proximity of objects in such a space is an effective surrogate for conceptual similarity in many applications.

In the continuing example, the final LSI space was generated as described above, based on the documents excluded as noise in the first iteration, the terms weighted in the second iteration. The test documents were folded into the space and compared to the training documents using k-nearest-neighbor (kNN) comparisons. As with the other variable parameters, a value for k was selected based on tests using the training and evaluation partition of the training set. For the R52 case, the value turned out to be k=1. For the R8 case, the value was k=3.

For the R52 subset, a microaveraged F1 measure of 0.9443 was measured. This exceeds the best result of 0.9393 from a collection of hundreds of papers on the subject. The difference corresponds to correctly categorizing an additional 13 documents. In applying our approach to the R8 subset of the collection, a micro-averaged F1 value of 0.9703 was measured. This does exceed the best previous result.

In the overall approach for this problem, 11 parameter choices were required. As noted above, the values for all of these parameters were derived from testing using 10% of the training documents as a verification set. Table 1 shows the parameter choices that were generated in the R8 and R52 cases.

TABLE 1

| Parameter | Value derived using 10% of training documents for validation | |
|---|---|---|
| | R8 | R52 |
| Stopwords | baseline + blah + reuter | baseline + blah + reuter |
| Required # of term occurrences | 5 | 5 |
| Dimensions | 300 | 300 |
| Category tokens per document | 5 | 5 |
| Title repetition (additional) | 5 | 5 |
| Closest centroids compared to | 1 | 2 |
| Entity weighting | 0 | 0 |
| Phrase processing | none | none |
| Top features per category kept | 1600 | 400 |
| Weighting of top 10 features | 1.4 | 1.4 |
| k in final kNN classification | 3 | 1 |

The final categorization results were not highly sensitive to specific choices of the above parameters. For example, changing the term pruning value for this collection from 5 to 10 yields less than a 0.3% change in the final μF1 value. Similar results are observed for stopwords and dimensions.

Other Example Embodiments

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

Electronic mail spam filtering is one application area for the technology disclosed hereon. In spam filtering, one objective is to segregate unwanted e-mails such as advertisements (spam) from non-spam. This can be achieved in the following manner. A sample of e-mails that have been identified as spam is used as a training set. A corpus of e-mails (a collection of items) is used to create an LSI space. Both item (e-mail message) noise and feature (terms in the email content and e-mail metadata) noise of this space are mitigated using the technology described herein.

Representation vectors for the spam e-mails are created in the LSI space, either as included in the training corpus or through the process of folding-in described above. For each received email, a representation vector is created in the LSI space through the process of folding-in. The vector created for each received email is compared to the vectors representing the previously identified spam e-mails (usually via a cosine measure in the space).

If the vector for the newly received e-mail is close to the vector for one of the spam-emails, it is categorized as spam and filtered out (not presented to the user). Specific methods for comparison (e.g., kNN) and thresholds for "closeness" are determined heuristically.

This has turned out to be a very effective technique for spam filtering. Purveyors of spam are constantly changing the specific wording of their e-mails in order to avoid easy detection. The conceptual matching capability of LSI allows detection of e-mails with similar conceptual content despite the fact that they contain different terminology.

In e-mail spam filtering, some terms occur in both spam and valid e-mails. The technique described here will tend to de-emphasize the importance of such terms, making it less likely that valid e-mails will be assigned to the spam category. Conversely, terms that are relatively unique to spam will be emphasized, making it more likely that e-mails containing those terms will be assigned to the spam category. Similarly, for items—spam e-mails that happen to contain a lot of valid text do not represent the best examples for categorization, and their effects will be de-emphasized, making it less likely that valid e-mails will be erroneously assigned to the spam e-mail category.

The method described here can be used in other key text processing tasks such as clustering and conceptual search. In fact, it can be of value across the entire range of applications where LSI is used, including: information discovery, text summarization, relationship discovery, automatic generation of link charts of individuals and organizations, matching technical papers and grants with reviewers, online customer support, determining document authorship, automatic keyword annotation of images, understanding software source code, filtering spam, information visualization, essay scoring, literature-based discovery, and stock returns prediction.

In addition to improved accuracy in comparison to other methods, the technology disclosed herein provides higher computational efficiency in comparison to other techniques for noise reduction in semantic spaces, particularly for the more powerful ones. For example, treating meaningful phrases as lexical units when creating the original term-document matrix in many cases is a powerful approach to reducing term noise. However, identifying meaningful phrases to be marked up as units (e.g. rare_earth_element) is computationally demanding. In general, multiple steps are required. First, a list of candidate phrases must be created. This can be done using natural language processing (NLP) techniques, such as parsing sentences to identify grammatical constituents, particularly noun phrases. Such parsing is a computationally intensive process, which must be applied to all of the sentences of the corpus of interest. Alternatively, statistical analysis software can be used to identify candidate phrases.

This is a brute force approach, processing all of the text of the corpus, noting adjacent occurrences of terms, and keeping a running total of all such occurrences. Typically, these approaches overproduce—they yield lists of candidate phrases that contain many items that do not have discrimination value (e.g., the_system, group_size, equal_length, present_findings, etc.). If all of the identified terms are incorporated into the term-document matrix from which the LSI space is built, there will be a general reduction in the quality of the representation space.

Thus, there needs to be a subsequent step to choose which terms are likely to be valuable. Techniques for doing so have limited effectiveness and generally are computationally intensive. Phrase processing was attempted in the study used as an example. Several techniques (entropy, mutual information, etc.) were employed in an attempt to select useful phrases from the candidate lists generated. In that particular instance, none of these techniques provided noticeable improvement in categorization performance. Each attempt, however, including both candidate list generation time and phrase selection time, required 1-2 minutes of processing time. In contrast, each LSI space iteration in the example study required only 11 seconds of computation.

One of the benefits of the technology disclosed herein is that, in some embodiments, it can work solely with generated vectors, so its application can be independent of the technique used to generate the vectors. It also can be used with equivalent constructs, such as graphs, or with more complex representations, such as tensors. In the case of tensor analysis, as in High Order Singular Value Decomposition (HOSVD), the only difference is that the iterations involve generation of new tensors, rather than new matrices. In addition to HOSVD, the technology disclosed herein has application in vector spaces formed by Correlated Occurrence Analogue to Lexical Semantics (COALS), and Global vectors (Glove). The technology also applies to situations in which other vector space techniques are employed, such as the classical vector space model (VSM), random indexing (RI), non-negative matrix factorization (NNMF), semi-discrete decomposition (SDD), latent regression analysis (LRA), self-organizing maps, Word2vec, convolutional latent semantic models, higher order SVD (HOSVD), tensor factorization etc. It also can be applied to vector spaces or equivalent constructs generated using neural networks, including neural networks employed in deep learning applications.

In some embodiments, noisy documents can be identified and weighted in a manner that does not require use of centroids. Given K categories, with $M_i$ training documents labeled as belonging to category i, one could examine each of the labeled training documents individually (in the initial LSI space). The N terms that are closest to each document can be found. For each category $C_i$ take some function (union, intersection, etc.) of the N terms that are closest to each of the training documents in that category individually. (So there would be $\leq N*M_i$ terms in the set that function was applied to and the function would yield P terms). Apply a weighting function to each document, for example, based on how many of the P terms appeared in the document.

Similarly, there are approaches to determining what terms might be most important that do not rely on centroids. One can do something somewhat analogous to the above, such as the following. Examine each of the terms individually (in the second (or nth) LSI space). Find the N training documents that are closest to each term. If there is a preponderance of one label for those closest documents, weight the term in a positive manner. If the labels of the closest documents are fairly evenly distributed across several categories, weight the term in a negative manner.

Further, while the continuing example provided herein relates to categorization, the technology disclosed herein applies as well to clustering. That is, there are no labeled training documents, and the objective is to create clusters based purely on the content of the documents. There are many techniques for clustering documents. Each involves a metric to determine the similarity of two documents, such as the cosine in an LSI space. The initial LSI space can be created, document clustering can be performed with a technique such as hierarchical agglomerative clustering, and then examine the clusters. The approach can then exclude documents that end up in one-document clusters, or that are the farthest away from the other documents of a cluster. Similarly, terms that are closely associated with those documents can be excluded. After excluding one or both of noisy documents and terms, a new vector space can be determined.

The continuing example used both one and two iterations of the LSI spaces employed. As described above, the technology disclosed herein can provide benefit with just one iteration, attempting to mitigate against both item and feature noise (or just one of them) in one step.

In addition, many applications could benefit from applying more than two iterations. The effects of term and document noise are interdependent. In some situations described in research papers rather severe thresholds were applied in each step (hundreds of documents and thousands of terms were eliminated from the spaces in just two iterations). In other situations, less severe thresholds could have been employed. A less severe degree of document noise elimination can be applied in the first iteration and a less severe degree of term noise elimination can be applied in the second iteration. Multiple additional iterations then could have been applied. There is no guarantee that the best possible set of documents to be eliminated will be obtained in the first iteration. Similarly, there is no guarantee that the best possible set of terms to be eliminated will be obtained in the second iteration applied for this purpose.

Using a more gradual approach, with N iterations, can achieve better results. For example, with regard to the R8 subset above, 189 training documents were eliminated in one step. This was a reasonable choice based on the information available at that time. However, in a more gradual approach, more information is available at each step. One approach eliminates a fraction, for example 1/M of the 189 documents, in each step. After the first step, in an LSI space built at that point, initial decisions about how to weight terms are then made in a second step. These weights also are then applied in a less severe manner. Continuing in this manner, at each of M−1 subsequent document noise reduction steps, there is then more information available with which to make decisions. It is quite possible that, at some point, the effects of several steps of term noise reduction would have allowed some of the 189 documents to be retained. Consider a training document that constituted a poor example of its' labeled category because of the presence of several occurrences of a term that actually was only incidentally related to that category. At one of the term noise reduction steps, that term might be eliminated. If so, in the next step, the new representation vector for that training document would be very different from what it had previously been. It might well be that, with that distracting term eliminated, the resulting document constituted an acceptable example of its labeled category. In most applications, labeled training data is quite limited. A gradual approach that allowed even a few more of the training documents to be retained would be highly likely to achieve improved performance.

As a variation on using N, M, and X counts for weighting, some embodiments of the present technology use thresholds. For example, a threshold is established and then features are positively weighted when their vectors had a higher cosine with respect to the centroids; and negatively weight those with cosines less than the threshold. Of course, using a threshold creates partitions that will have N and M vectors for some N and M, but the specific numbers do not have to be determined in advance.

The invention claimed is:

1. A computer-implemented method to mitigate noise in vector space representations of item collections, the method comprising:
  receiving, by one or more computing devices, a collection of items, each item characterized by a plurality of features;
  preparing, by the one or more computing devices, a first vector space representative of the collection, wherein each item in the first vector space is represented by a vector that is a function of the features characterizing the item;
  first identifying, by the one or more computing devices and based on information characteristic of the first vector space, only a first one of: items contributing to first vector space noise, and features contributing to first vector space noise;
  first weighting, by the one or more computing devices, the first identified items and features to decrease the influence of the first identified items and features on vector spaces representative of the collection;
  preparing, by the one or more computing devices, a second vector space representative of the collection based on the first weighted items and features;
  second identifying, based on information characteristic of the second vector space, the first one of:
    items contributing to second vector space noise and
    features contributing to second vector space noise;
  second weighting the second identified items and features to decrease the influence of the second identified items and features on vector spaces representative of the collection; and
  preparing a third vector space representative of the collection based on the cumulatively weighted items and features, wherein each item is represented by a vector that is sum of the vectors of the features comprising the item.

2. The method of claim 1, wherein the first weighting comprises deleting the first identified items from the collection prior to preparing the second vector space.

3. The method of claim 1, wherein:
  each item is characterized by a category feature having a category value; and
  first identifying items comprises identifying particular items characterized by a vector in the first vector space that is closer to the centroid of vectors associated with at least one other category value than to the centroid of the vectors associated with the category value of the particular item.

4. The method of claim 1, wherein:
  each item is characterized by a category feature having a category value, and each category value is represented by the centroid of items characterized by the category value; and
  first identifying features contributing to first vector space noise comprises:
    identifying the N feature vectors closest to the centroid of the item vectors of at least one category value; and
    identifying the M feature vectors farther than X feature vectors from the centroid of the item vectors of at least one category value, wherein X is greater than or equal to N; and
  first weighting the first identified items and features comprises:
    weighting the identified N feature vectors to increase the influence of the N feature vectors on vector spaces representative of the collection, and
    weighting the identified M feature vectors to decrease the influence of the M feature vectors on vector spaces representative of the collection.

5. The method of claim 1:
  wherein first identifying comprises identifying only a first one of:
    items contributing to vector space noise and
    features contributing to vector space noise; and
  the method further comprises, after preparing the second vector space representation:
    second identifying, based on information characteristic of the second vector space, the other one of:
      items contributing to second vector space noise and
      features contributing to second vector space noise;
    second weighting the second identified items and features to decrease the influence of the second identified items and features on vector spaces representative of the collection; and
    preparing a third vector space representative of the collection based on the cumulatively weighted items and features, wherein each item is represented by a vector that is a function of the features comprising the item.

6. The method of claim 1, wherein each prepared vector space is a latent semantic indexed vector space.

7. The method of claim 1:
  wherein each item is characterized by a category feature having a category value; and
  the method further comprises:
    folding in to the second vector space a vector corresponding to an item to be categorized; and
    categorizing the item to be categorized with the category value of the category feature having a vector in the second vector space closest to the folded-in vector.

8. A computer program product, comprising:
  a non-transitory computer-readable storage device having computer-executable program instructions embodied thereon that when executed by a computer cause the computer to mitigate noise in vector space representations of item collections, the computer-executable program instructions comprising:
    computer-executable program instructions to receive a collection of items, each item characterized by a plurality of features;
    computer-executable program instructions to prepare a first vector space representative of the collection, wherein each item in the first vector space is represented by a vector that is a function of the features characterizing the item;
    computer-executable program instructions to first identify, based on information characteristic of the first vector space, only a first one of:
      items contributing to first vector space noise, and
      features contributing to first vector space noise;
    computer-executable program instructions to first weight the first identified items and features to decrease the influence of the first identified items and features on vector spaces representative of the collection;

computer-executable program instructions to prepare a second vector space representative of the collection based on the first weighted items and features; and computer-executable program instructions to second identify, based on information characteristic of the second vector space, the first one of:
items contributing to second vector space noise and features contributing to second vector space noise;

computer-executable program instructions to second weight the second identified items and features to decrease the influence of the second identified items and features on vector spaces representative of the collection; and computer-executable program instructions to prepare a third vector space representative of the collection based on the cumulatively weighted items and features, wherein each item is represented by a vector that is sum of the vectors of the features comprising the item.

9. The computer program product of claim 8, wherein the first weighting comprises deleting the first identified items from the collection prior to preparing the second vector space.

10. The computer program product of claim 8, wherein:
each item is characterized by a category feature having a category value; and
first identifying items comprises identifying particular items characterized by a vector in the first vector space that is closer to the centroid of vectors associated with at least one other category value than to the centroid of the vectors associated with the category value of the particular item.

11. The computer program product of claim 8, wherein:
each item is characterized by a category feature having a category value, and each category value is represented by the centroid of vectors of the items characterized by the category value; and
first identifying features contributing to first vector space noise comprises:
identifying the N feature vectors closest to the centroid of the item vectors of at least one category value; and
identifying the M feature vectors farther than X feature vectors from the centroid of the item vectors of at least one category value, wherein X is greater than or equal to N; and
first weighting the first identified items and features comprises:
weighting the identified N feature vectors to increase the influence of the N feature vectors on vector spaces representative of the collection, and
weighting the identified M feature vectors to decrease the influence of the M feature vectors on vector spaces representative of the collection.

12. The computer program product of claim 8:
wherein first identifying comprises identifying only a first one of:
items contributing to vector space noise and
features contributing to vector space noise; and
the computer program product further comprises computer-executable program instructions to, after preparing the second vector space representation:
second identify, based on information characteristic of the second vector space, the other one of:
items contributing to second vector space noise and features contributing to second vector space noise;
second weight the second identified items and features to decrease the influence of the second identified items and features on vector spaces representative of the collection; and
prepare a third vector space representative of the collection based on the cumulatively weighted items and features, wherein each item is represented by a vector that is function of the features comprising the item.

13. The computer program product of claim 8, wherein each prepared vector space is a latent semantic indexed vector space.

14. The computer program product of claim 8:
wherein each item is characterized by a category feature having a category value; and
the computer program product further comprises computer-executable program instructions to:
fold in to the second vector space a vector corresponding an item to be categorized; and
categorize the item to be categorized with the category value of the category feature having a vector in the second vector space closest to the folded-in vector.

15. A system to mitigate noise in vector space representations of item collections, the system comprising:
a storage device; and
a processor communicatively coupled to the storage device, wherein the processor executes application code instructions that are stored in the storage device to cause the system to:
receive a collection of items, each item characterized by a plurality of features;
prepare a first vector space representative of the collection, wherein each item in the first vector space is represented by a vector that is a function of the features characterizing the item;
first identify, based on information characteristic of the first vector space, only one of:
items contributing to first vector space noise, and features contributing to first vector space noise;
first weight the first identified items and features to decrease the influence of the first identified items and features on vector spaces representative of the collection;
prepare a second vector space representative of the collection based on the first weighted items and features;
second identify, based on information characteristic of the second vector space, the first one of:
items contributing to second vector space noise and features contributing to second vector space noise;
second weight the second identified items and features to decrease the influence of the second identified items and features on vector spaces representative of the collection; and
prepare a third vector space representative of the collection based on the cumulatively weighted items and features, wherein each item is represented by a vector that is sum of the vectors of the features comprising the item.

16. The system of claim 15, wherein the first weighting comprises deleting the first identified items from the collection prior to preparing the second vector space.

17. The system of claim 15, wherein:
each item is characterized by a category feature having a category value; and first identifying items comprises identifying particular items characterized by a vector in the first vector space that is closer to the centroid of the item vectors associated with at least one other category value than to the centroid of the item vectors associated with the category value of the particular item.

18. The system of claim 15, wherein:

each item is characterized by a category feature having a category value, and each category value is represented by the centroid of vectors of items characterized by the category value; and first identifying features contributing to first vector space noise comprises:
- identifying the N feature vectors closest to the centroid of the item vectors of at least one category value; and
- identifying the M feature vectors farther than X feature vectors from the centroid of the item vectors of at least one category value, wherein X is greater than or equal to N; and first weighting the first identified items and features comprises:
- weighting the identified N feature vectors to increase the influence of the N feature vectors on vector spaces representative of the collection, and
- weighting the identified M feature vectors to decrease the influence of the M feature vectors on vector spaces representative of the collection.

* * * * *